US012385618B2

(12) United States Patent
Zhu et al.

(10) Patent No.: US 12,385,618 B2
(45) Date of Patent: Aug. 12, 2025

(54) VEHICLE LIGHT OPTICAL ELEMENT, VEHICLE LIGHT MODULE, AND VEHICLE LIGHT

(71) Applicant: HASCO VISION TECHNOLOGY CO., LTD., Shanghai (CN)

(72) Inventors: He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/245,842

(22) PCT Filed: May 11, 2021

(86) PCT No.: PCT/CN2021/093072
§ 371 (c)(1),
(2) Date: Mar. 17, 2023

(87) PCT Pub. No.: WO2022/068212
PCT Pub. Date: Apr. 7, 2022

(65) Prior Publication Data

US 2024/0302014 A1 Sep. 12, 2024

(30) Foreign Application Priority Data

Sep. 29, 2020 (CN) ........................ 202011050923.X

(51) Int. Cl.
*F21S 41/24* (2018.01)
*F21S 41/148* (2018.01)
(Continued)

(52) U.S. Cl.
CPC ........... *F21S 41/322* (2018.01); *F21S 41/148* (2018.01); *F21S 41/26* (2018.01);
(Continued)

(58) Field of Classification Search
CPC ........ F21S 41/322; F21S 41/148; F21S 41/26; F21S 41/147; F21S 41/20; F21S 41/285;
(Continued)

(56) References Cited

U.S. PATENT DOCUMENTS

2017/0030542 A1 2/2017 Gromfeld
2017/0059106 A1 3/2017 Sato
2017/0067610 A1 3/2017 Lo et al.

FOREIGN PATENT DOCUMENTS

CN 106439670 A 2/2017
CN 206708917 U 12/2017
(Continued)

OTHER PUBLICATIONS

Search English translation of CN-105358900-B (Year: 2018).*
(Continued)

*Primary Examiner* — Omar Rojas Cadima
(74) *Attorney, Agent, or Firm* — Volpe Koenig

(57) ABSTRACT

A vehicle light optical element, a vehicle light module, and a vehicle light. The vehicle light optical element comprises light-incident portions, a light-emergent face and a reflecting face, wherein the light-incident portions are arranged on a side of the light-emergent face; and the reflecting face is configured to be able to reflect light rays, which are emitted from the light-incident portions into the reflecting face, to the light-emergent face, so as to be emitted out of the light-emergent face. The vehicle light optical element has the characteristics of a smaller front-rear size, a smaller up-down size, and larger left-right size, and can better adapt to the current vehicle light shape trend.

13 Claims, 8 Drawing Sheets

(51) Int. Cl.

*F21S 41/26* (2018.01)
*F21S 41/32* (2018.01)
*F21W 102/13* (2018.01)
*F21W 107/10* (2018.01)
*F21Y 103/10* (2016.01)

(52) U.S. Cl.

CPC ..... *F21W 2102/13* (2018.01); *F21W 2107/10* (2018.01); *F21Y 2103/10* (2016.08)

(58) Field of Classification Search

CPC ............... F21S 43/239; F21Y 2103/10; F21W 2102/13; F21W 2107/10; F21W 2102/155; F21W 2102/16; F21W 2103/20; G02B 6/0046; G02B 6/0011; F21V 5/00; B60Q 1/2607; B60Q 1/34; B60Q 1/381; B60Q 2400/20

See application file for complete search history.

(56) References Cited

FOREIGN PATENT DOCUMENTS

| | | | | | |
|---|---|---|---|---|---|
| CN | 105358900 | B | * | 7/2018 | ................ B62J 6/02 |
| CN | 109724044 | A | * | 5/2019 | |
| CN | 109764304 | A | | 5/2019 | |
| CN | 110594692 | A | | 12/2019 | |
| CN | 210601445 | U | | 5/2020 | |
| CN | 210740266 | U | | 6/2020 | |
| CN | 212691666 | U | | 3/2021 | |
| CN | 112628684 | A | | 4/2021 | |
| DE | 102010061210 | A1 | * | 6/2012 | ............ F21S 48/215 |
| DE | 102011118277 | A1 | | 9/2012 | |
| DE | 102015207960 | A1 | | 11/2016 | |
| DE | 102017105838 | A1 | | 9/2018 | |
| DE | 102018115045 | A1 | | 12/2018 | |
| FR | 2966223 | A1 | * | 4/2012 | ............ F21S 48/115 |
| GB | 2501781 | A | * | 11/2013 | ........... B60Q 1/0035 |
| JP | 2015524986 | A | | 8/2015 | |
| KR | 20180061941 | A | * | 6/2018 | |
| KR | 20190062732 | A | * | 6/2019 | |
| KR | 20190080506 | A | | 7/2019 | |
| WO | 2020173073 | A1 | | 9/2020 | |
| WO | 2020173129 | A1 | | 9/2020 | |
| WO | 2020173444 | A1 | | 9/2020 | |
| WO | 2021147734 | A1 | | 7/2021 | |

OTHER PUBLICATIONS

Search English translation of KR-20180061941-A (Year: 2018).*
Search English translation of CN-109724044-A (Year: 2019).*
Search English translation of FR-2966223-A1 (Year: 2010).*
Search English translation of DE-102010061210-A1 (Year: 2012).*
Search English translation of KR-20190062732-A (Year: 2019).*
European Office Action issued on Feb. 14, 2024 for European Patent Application No. 21873875.5.
Chinese Office Action issued on Mar. 8, 2025 for Chinese Patent Application No. 202011050923.X.
Communication pursuant to Article 94(3) EPC issued on Feb. 20, 2025 for European Patent Application No. 21873875.5.

* cited by examiner

VEHICLE LIGHT OPTICAL ELEMENT, VEHICLE LIGHT MODULE, AND VEHICLE LIGHT

CROSS-REFERENCE TO RELATED APPLICATIONS

This application is a 35 U.S.C. § 371 national stage of International Application No. PCT/CN2021/093072, which was filed May 11, 2021 and claims priority to Chinese Patent Application No. 202011050923.X, filed on Sep. 29, 2020, both of which are incorporated herein by reference as if fully set forth.

FIELD

The present disclosure relates to a vehicle light, and in particular to a vehicle light optical element. The present disclosure further relates to a vehicle light module and a vehicle light.

BACKGROUND

The shape of vehicle lights is becoming narrower and longer, that is, the up-down size is smaller and smaller and the left-right size is larger and larger. With the miniaturization of vehicle lights, the front-rear size of the vehicle lights is required to be smaller and smaller. The up-down, left-right and front-rear sizes are consistent with the direction of the whole vehicle.

A vehicle light optical element is an optical element for collecting, transmitting and converging light rays emitted by a light source to form the required light distribution. To adapt to the development trend of the shape of the vehicle light, the vehicle light optical element also shows the trend of the smaller and smaller up-down size, the larger and larger left-right size and the smaller and smaller front-rear size.

A concentrator is a commonly used vehicle light optical element with a smaller size. The structure of the common concentrator is as shown in FIG. 1, a light inlet 6 is formed at the rear end of a concentrator 1*a*, a light outlet 7 is formed at the front end of the concentrator 1*a*, a light source is arranged at the light inlet 6, and light rays emitted by the light source enter a light guide portion 4 via the light inlet 6, are transmitted and refracted by the light guide portion 4, and are emitted out of the light outlet 7. Such a structure makes the front-rear size of the concentrator 1*a* longer; furthermore, since the light source needs to be arranged behind the light inlet 6, the light source and a radiator structure connected to the light source further increase the front-rear size of the vehicle light and limit the reduction of the front-rear size of the vehicle light.

Recently, a bending type concentrator appears. As shown in FIG. 2, a light inlet 6 is formed at the lower end of a concentrator 1*b*, a light outlet 7 is formed at the front end of the concentrator 1*b*, a light source is arranged at the light inlet 6, light rays emitted by the light source enter a light guide portion 4 from the light inlet 6, are reflected by a reflecting face and then are emitted out of the light outlet 7. Such a structure reduces the front-rear size of the concentrator 1*b*, but a concentrating cup 2 arranged vertically makes the up-down size of the concentrator 1*b* larger; furthermore, it is also necessary to arrange a light source and a radiator structure connected to the light source below the light inlet 6, so that the up-down size of the vehicle light is further increased.

The existing vehicle light optical element cannot meet the requirement of the modeling development trend of the current vehicle light, which hinders the modeling development of the vehicle light. A vehicle light optical element applied to a narrow and long vehicle light with the smaller front-rear size and the smaller up-down size is urgently required in the market.

SUMMARY

The technical problem to be solved by the present disclosure is to provide a vehicle light optical element. The vehicle light optical element has a smaller front-rear size and a smaller up-down size.

The technical problem to be further solved by the present disclosure is to provide a vehicle light module. The vehicle light module has a smaller front-rear size and a smaller up-down size.

The technical problem to be further solved by the present disclosure is to provide a vehicle light. The vehicle light has a flat shape with a smaller front-rear size, a smaller up-down size and a larger left-right size.

To solve the above technical problems, a first aspect of the present disclosure provides a vehicle light optical element, including a light-incident portion, a light-emergent face and a reflecting face, wherein the light-incident portion is arranged on a side of the light-emergent face; and the reflecting face is configured to be able to reflect light rays, which are emitted from the light-incident portion into the reflecting face, to the light-emergent face, so as to be emitted out of the light-emergent face.

Preferably, the reflecting face is a flat face which is obliquely arranged relative to the light-incident portion and the light-emergent face. In the preferred technical solution, the oblique planar reflecting face can reflect light rays, which are emitted from the light-incident portion to the reflecting face, to the light-emergent face, and the light rays can be emitted out of the light-emergent face in a direction generally perpendicular to the light-emergent face. The emitted light rays are distributed uniformly.

Preferably, the light-incident portion includes a first light-incident portion and a second light-incident portion which are respectively arranged on two sides of the light-emergent face; and the reflecting face includes a first reflecting face capable of reflecting light rays which are emitted from the first light-incident portion to the first reflecting face, and are reflected to the light-emergent face by the first reflecting face, and a second reflecting face capable of reflecting light rays which are emitted from the second light-incident portion to the second reflecting face, and are reflected to the light-emergent face by the second reflecting face. In the preferred technical solution, more light rays emitted by the light source can be imported through the first light-incident portion and the second light-incident portion which are respectively arranged on two sides of the light-emergent face, so that the intensity of the light rays emitted out of the light-emergent face can be improved. Meanwhile, the number of the light-incident portions arranged on the same side can be reduced on the basis of ensuring the light-emergent intensity, so that the front-rear size of the vehicle light optical element can be further reduced.

Preferably, the vehicle light optical element provided by the present disclosure may further include a lens part, the lens part is integrally connected to the light-emergent face and capable of projecting light rays emitted out of the light-emergent face to form a lighting light shape. In the preferred technical solution, the lens part can realize the function of an ordinary lens, and project light rays emitted to the light-emergent face to form a lighting light shape. The light-emergent face is integrally connected to the lens part, so that the stability of the relative positions of the lens part and the light-emergent face can be improved, and the structure of the vehicle light module can be simplified.

Further preferably, the lens part includes a lens light-incident face and a lens light-emergent face; and the lens light-incident face is integrally connected to the light-emergent face. By the preferred technical solution, due to the integrated connection structure of the lens light-incident face and the light-emergent face, incident light rays can directly enter the lens part after being reflected by the reflecting face, so that the usual reflecting effect of the light-emergent face of the vehicle light optical element and the light-incident face of the lens on the light rays is reduced, and the light effect of the vehicle light module can be improved.

Further, the lens light-incident face coincides with the light-emergent face. In the preferred technical solution, due to the coinciding structure of the lens light-incident face and the light-emergent face, the lens part and other parts of the vehicle light optical element are integrated into a whole body, so that the overall stability of the vehicle light optical element is improved, and the manufacturing process of the vehicle light optical element can be simplified.

Preferably, the lens light-incident face is larger than the light-emergent face and the light-emergent face is integrally connected to an upper part or a lower part of the lens light-incident face. By the preferred technical solution, besides the part, connected to the light-emergent face, of the lens light-incident face, a part of the lens light-incident face is remained below or above the connected part, and other incident light rays can be received by this part of the lens light-incident face, so that the lens part can be configured to realize other lighting functions.

Preferably, the light-emergent face is provided with a cut-off line structure. In the preferred technical solution, the cut-off line structure can form a bright-dark cut-off line of a low beam lighting light shape or a high beam lighting light shape, thereby realizing a low beam lighting function or a high beam lighting function.

A second aspect of the present disclosure provides a vehicle light module. The vehicle light optical element provided by the first aspect of the present disclosure is used in the vehicle light module.

A third aspect of the present disclosure provides a vehicle light. The vehicle light module provided by the second aspect of the present disclosure is used in the vehicle light.

By the above technical solution, according to the vehicle light optical element provided by the present disclosure, the light-incident portion is arranged on the side of the light-emergent face, so that the front-rear size and the up-down size of the vehicle light optical element are reduced, and the vehicle light optical element has a flat structure with a smaller front-rear size, a smaller up-down size and a larger left-right size. Meanwhile, the light source of the vehicle light and the radiator structure of the light source can be arranged on the side of the vehicle light optical element and can better adapt to the current flat vehicle light modeling trend. The structure that light-incident portions are respectively arranged on the left and right sides of the light-emergent face can further shorten the front-rear size of the vehicle light optical element and adapt to the modeling requirement of the vehicle light. The light-emergent face is integrally connected to the lens part, so that the vehicle light optical element provided by the present disclosure realizes the function of the lens and has higher structural stability, and the vehicle light has a simpler structure. Due to the structure that one part of the lens light-incident face of the lens part is integrally connected to the light-emergent face, the lens part of the vehicle light optical element may be used as an ordinary lens and be configured to realize other lighting functions. The vehicle light module provided by the present disclosure adopts the vehicle light optical element provided by the present disclosure, which has a smaller front-rear size, a smaller up-down size and a larger left-right size and meets the current modeling trend of the vehicle light. The vehicle light provided by the present disclosure adopts the vehicle light module provided by the present disclosure, so the vehicle light also has the above advantages.

Other technical features and technical effects of the present disclosure will be further described in the following specific embodiments.

DESCRIPTION OF REFERENCE NUMERALS

| | | | |
|---|---|---|---|
| 1 | Light-incident portion | 11 | First light-incident portion |
| 12 | Second light-incident portion | 2 | Light-emergent face |
| 21 | Cut-off line structure | 3 | Reflecting face |
| 31 | First reflecting face | 32 | Second reflecting face |
| 4 | Lens part | 41 | Lens light-incident face |
| 42 | Lens light-emergent face | 5 | Light source |
| 51 | Low beam light source | 52 | High beam light source |
| 6 | Lens | 61 | Optical axis |
| 7 | Low beam reflector | | |

DETAILED DESCRIPTION OF THE EMBODIMENTS

In the present disclosure, unless otherwise stated, the orientation or position relation indicated by the used orientation words such as “front, rear, upper, lower, left and right” is the orientation or position relation after a vehicle light provided by the present disclosure is normally mounted on the vehicle. The direction indicated by the orientation word “front” is the normal driving direction of the vehicle. The description of the orientation or position relation among a vehicle light optical element, a vehicle light module and parts thereof provided by the present disclosure is consistent with the mounting orientation in actual use.

The terms “first” and “second” are used only for description and cannot be understood as an indication or implication of relative importance or an implicit indication of the number of technical features. Therefore, the features limited by “first” and “second” may explicitly or implicitly include one or more of the features.

In the description of the present disclosure, it should also be noted that unless otherwise specified and limited, the terms “mounting”, “arranged” and “connection” should be understood in a broad sense. For example, the term “connection” may be fixed connection, detachable connection or integrated connection, or may be direct connection, or may be indirect connection through an intermediate medium, or may be internal communication between two components or an interactive relation between two components. A person of ordinary skill in the art may understand specific meanings of the foregoing terms in the present disclosure based on a specific situation.

The specific embodiments of the present disclosure are described below in detail with reference to the accompanying drawings. It should be understood that the specific embodiments described herein are only used to illustrate and explain the present disclosure, but the protection scope of the present disclosure is not limited to the following specific embodiments.

Figure 1:
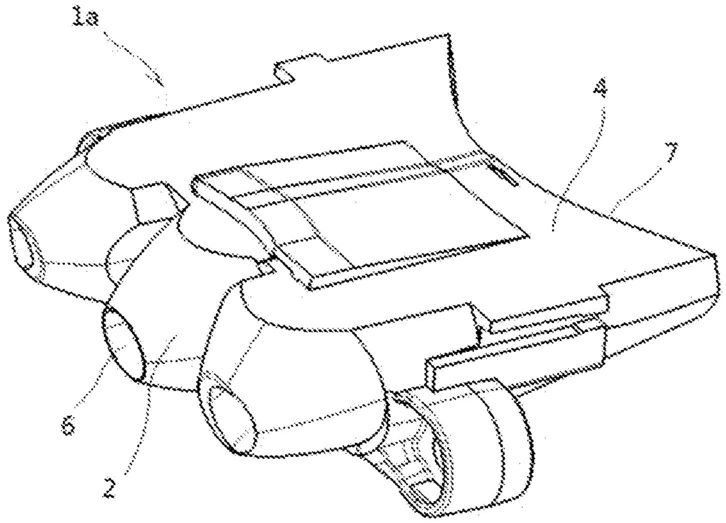
FIG. 1 is a structural schematic diagram of a common concentrator.
Figure 2:
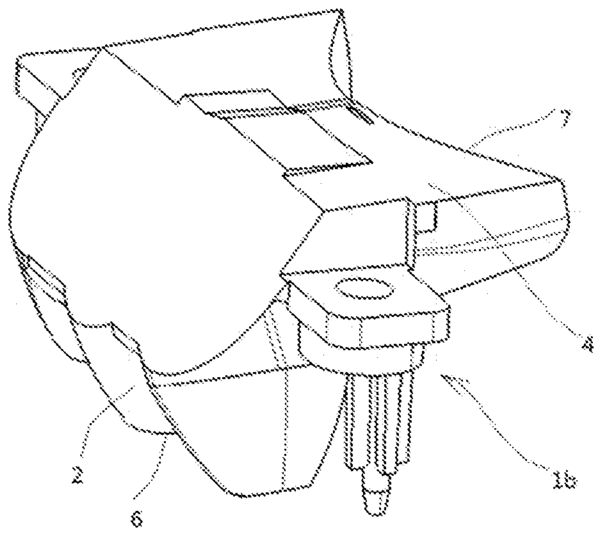
FIG. 2 is a structural schematic diagram of an existing bending-type concentrator.
Figure 3:
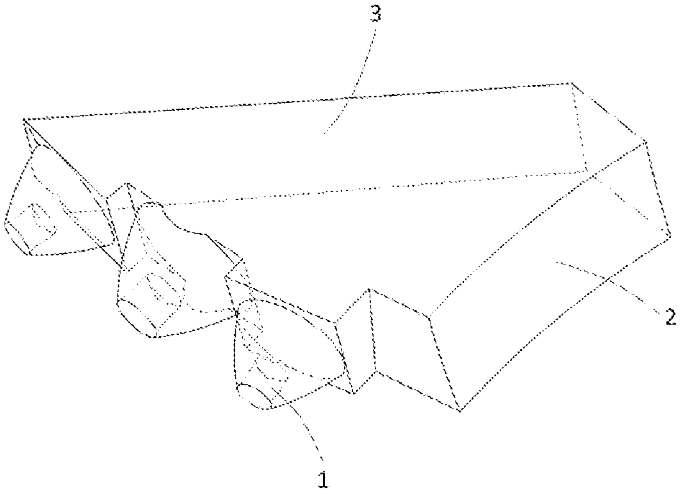
FIG. 3 is a three-dimensional diagram of an embodiment of a vehicle light optical element according to the present disclosure.
Figure 4:
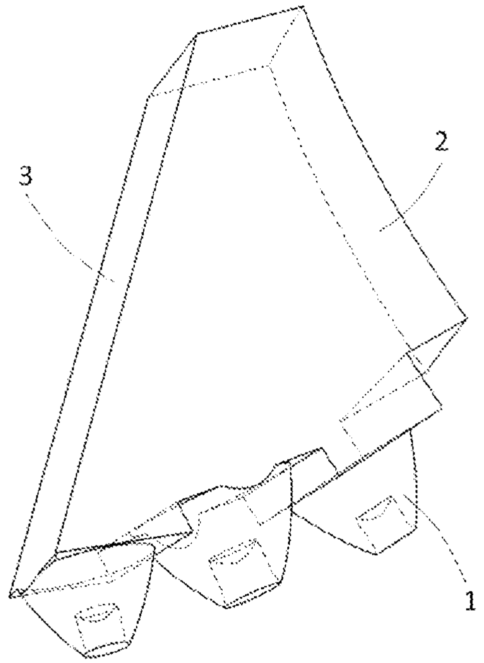
FIG. 4 is a three-dimensional diagram of FIG. 3 from another perspective.
Figure 5:
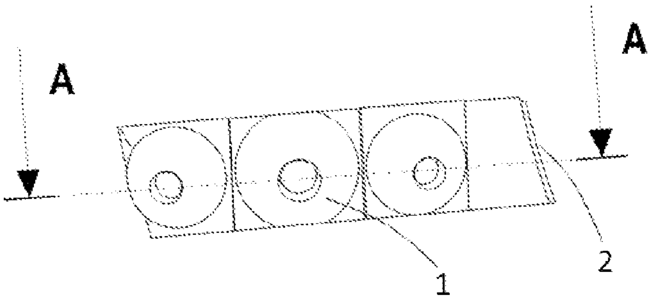
FIG. 5 is a right side view of FIG. 3.
Figure 6:
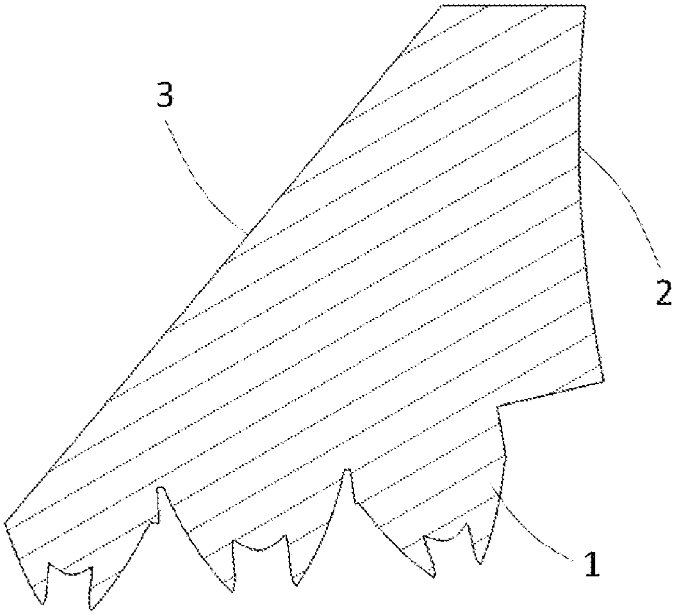
FIG. 6 is a sectional view of FIG. 5 in a direction A-A.
Figure 7:
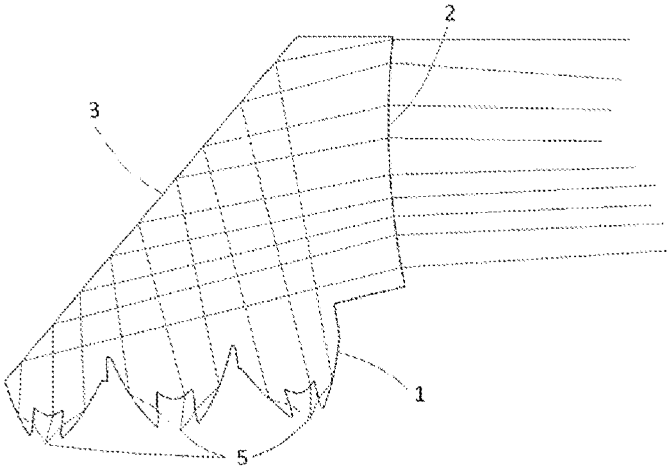
FIG. 7 is a schematic diagram of a light path of an embodiment of a vehicle light optical element according to the present disclosure.
Figure 8:
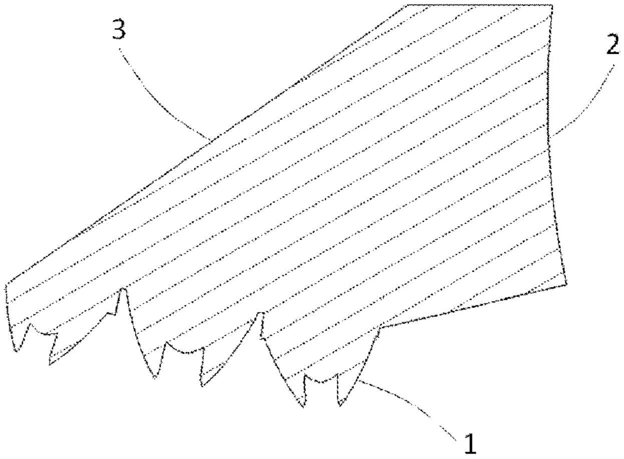
FIG. 8 is a schematic sectional view of an embodiment of a vehicle light optical element according to the present disclosure.

As shown in FIG. 3 to FIG. 6, an embodiment of a vehicle light optical element provided by the present disclosure includes light-incident portions 1, a light-emergent face 2 and a reflecting face 3. The light-incident portion 1 is of a structure suitable for importing light rays emitted by a light source. Specifically, the light-incident portion 1 may be of a concentrating cup structure, or may be of other light-incident structures with flat, concave or convex light-incident faces. Only one light-incident portion 1 may be provided, or a plurality of light-incident portions 1 may be provided. The light-emergent face 2 is a flat face or a curved face suitable for exporting light rays, and adapts to the requirements of the flat model of the current vehicle light. The light-emergent face 2 is usually set into a long strip shape. The light-incident portion 1 is arranged on a side of the light-emergent face 2. Generally, the light-emergent face 2 is arranged at the front end of the vehicle light optical element. The light-incident portion 1 may be arranged on a left side of the vehicle light optical element, or may be arranged on a right side of the vehicle light optical element. The reflecting face 3 can reflect light rays, which are emitted from the light-incident portion 1 into the reflecting face, to the light-emergent face 2. Preferably, a reflectivity-increasing film may be arranged on the reflecting face 3 to improve the reflectivity. The reflecting face 3 may be set as a flat face, a columnar face, a concave face, a convex face or a free curved face. As shown in FIG. 7, the light-incident portions 1 can import light rays emitted by the light sources 5, so that the light rays emitted by the light sources 5 are emitted to the reflecting face 3, are emitted to the light-emergent face 2 after being reflected by the reflecting face 3, and then are emitted out of the light-emergent face 2. When the vehicle light optical element has a plurality of light-incident portions 1, light rays emitted by different light sources 5 can be imported from different light-incident portions 1, and are emitted out of the light-emergent face 2 after being transmitted and refracted by the vehicle light optical element and reflected by the reflecting face 3 to form emitted light rays distributed uniformly.

In some embodiments of the vehicle light optical element of the present disclosure, as shown in FIG. 3, FIG. 4 and FIG. 6 to FIG. 8, the reflecting face 3 is a flat face which is obliquely arranged on opposite sides of the light-incident portion 1 and the light-emergent face 2. The vehicle light optical element in this embodiment is integrally set as a prism shape, the reflecting face 3, the light-incident portion 1 and the light-emergent face 2 are formed on different sides of the prism, and the reflecting face 3 is obliquely arranged relative to a face where the light-incident portion 1 is located and the light-emergent face 2. According to different included angles between the face where the light-incident portion 1 is located and the light-emergent face 2, or according to different requirements on the transmission directions of light rays in the light distribution process of the vehicle light, the reflecting face 3 may show different inclinations with the face where the light-incident portion 1 is located and the light-emergent face 2. The planar reflecting face 3 can reflect light rays irradiated from the light-incident portion 1 to the light-emergent face 2, and the light rays may be emitted out of the light-emergent face 2 in a direction generally perpendicular to the light-emergent face. The planar reflecting face 3 is simple in arrangement and does not change the original light distribution of the emitted light rays.

Figure 9:
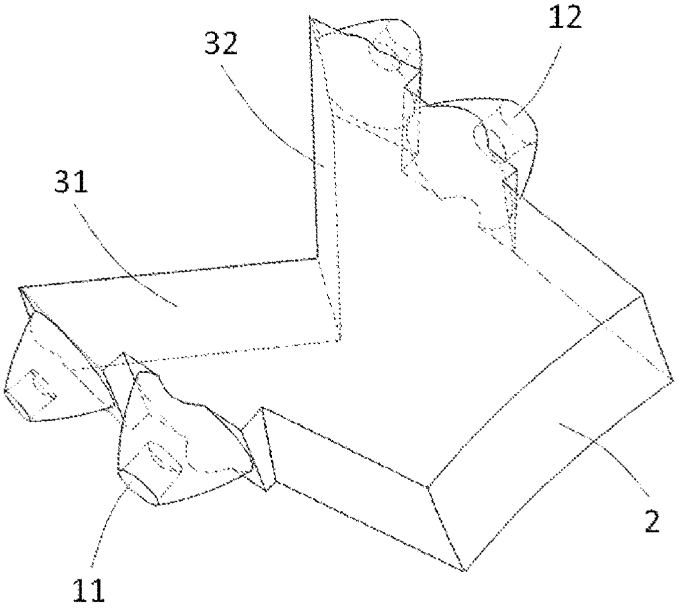
FIG. 9 is a three-dimensional schematic diagram of an embodiment of a vehicle light optical element according to the present disclosure.
Figure 10:
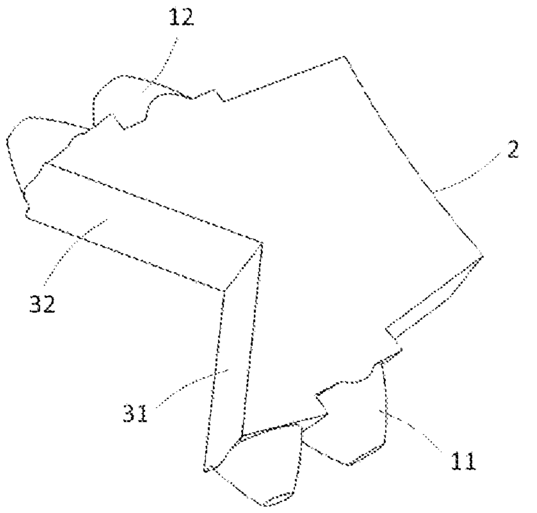
FIG. 10 is a three-dimensional diagram of FIG. 9 from another perspective.
Figure 11:
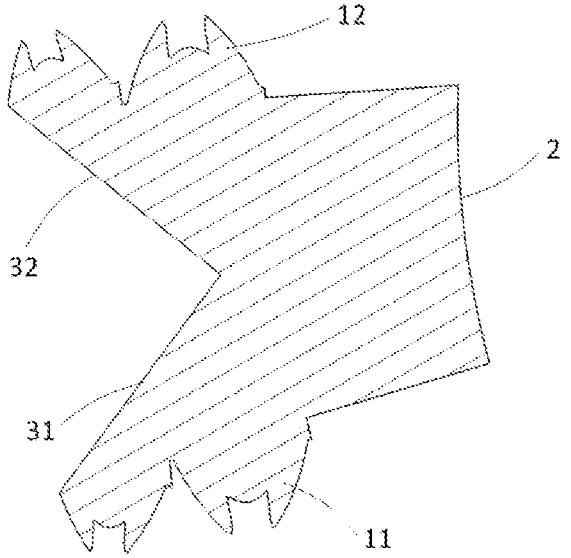
FIG. 11 is a schematic sectional view of FIG. 9.
Figure 12:
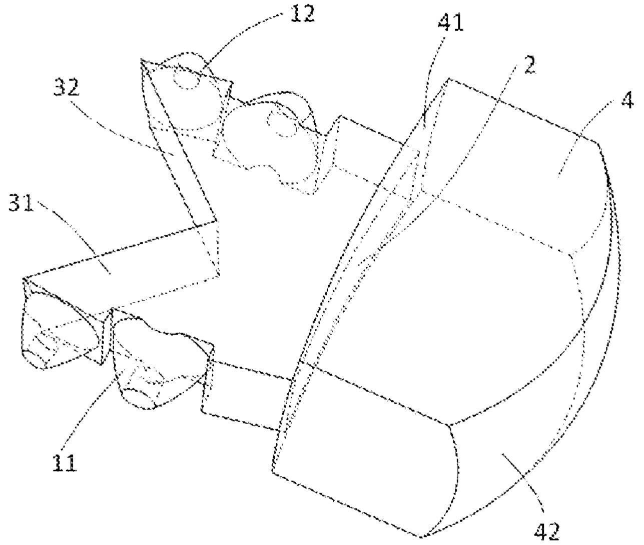
FIG. 12 is a three-dimensional schematic diagram of an embodiment of a vehicle light optical element according to the present disclosure.
Figure 13:
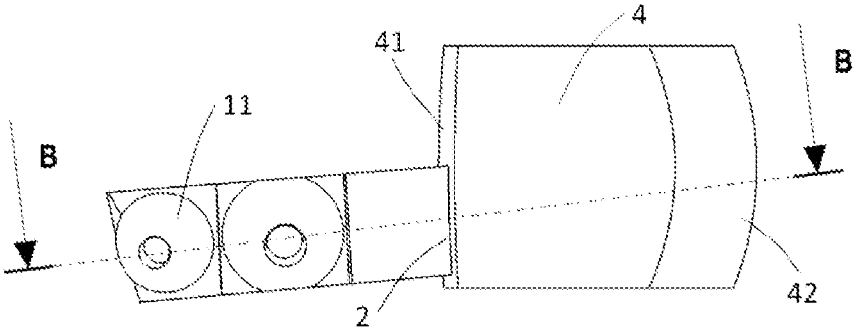
FIG. 13 is a right side view of FIG. 12.
Figure 14:
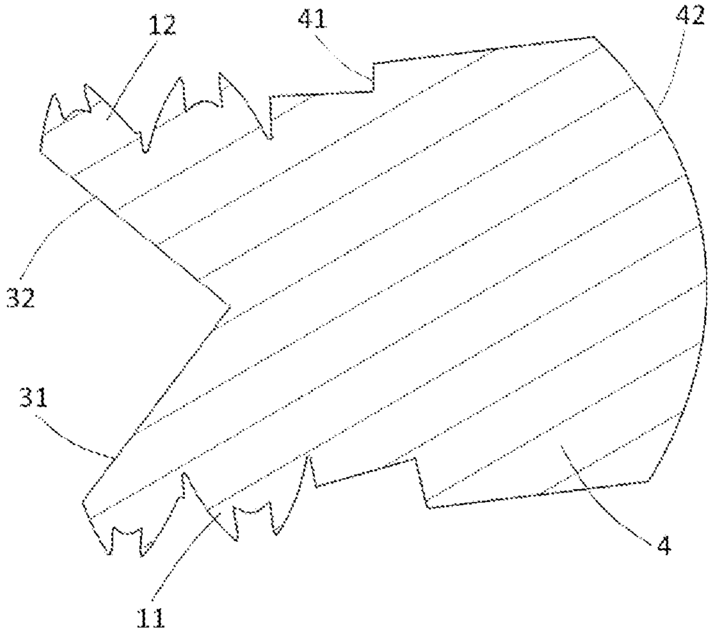
FIG. 14 is a sectional view of FIG. 13 in a direction B-B.
Figure 15:
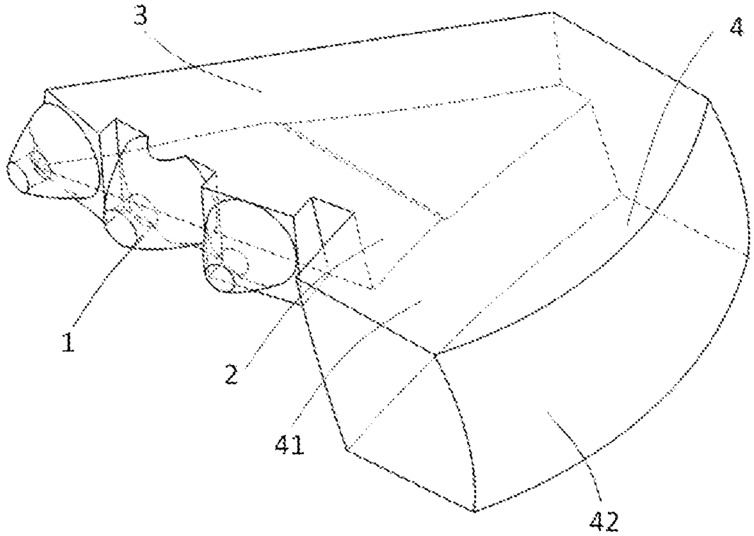
FIG. 15 is a three-dimensional schematic diagram of an embodiment of a vehicle light optical element according to the present disclosure.
Figure 16:
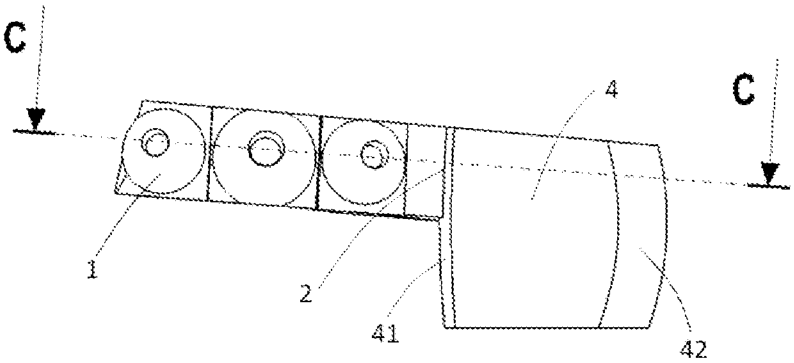
FIG. 16 is a right side view of FIG. 15.
Figure 17:
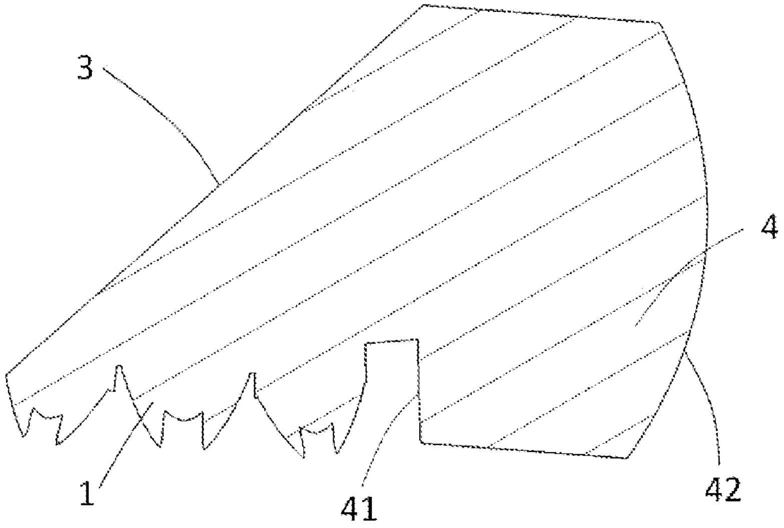
FIG. 17 is a sectional view of FIG. 16 in a direction C-C.

As a specific implementation mode of the vehicle light optical element provided by the present disclosure, as shown in FIG. 9 to FIG. 11, the light-incident portion 1 includes a first light-incident portion 11 and a second light-incident portion 12 which are respectively arranged; and the reflecting face 3 includes a first reflecting face 31 and a second reflecting face 32 which are respectively arranged. The first light-incident portion 11 is arranged on a right side of the vehicle light optical element. The first reflecting face 31 is arranged opposite to the first light-incident portion 11 and the light-emergent face 2 and can reflect light rays imported by the first light-incident portion 11 to the light-emergent face 2, and the light rays can be emitted out of the light-emergent face 2. The second light-incident portion 12 is arranged on a left side of the vehicle light optical element. The second reflecting face 32 is arranged opposite to the second light-incident portion 12 and the light-emergent face 2 and can reflect light rays imported by the second light-incident portion 12 to the light-emergent face 2, and the light rays can be emitted out of the light-emergent face 2. The light rays imported by the first light-incident portion 11 and the light rays imported by the second light-incident portion 12 may be radiated to different areas of the light-emergent face 2, and may be mutually combined to form uniformly distributed light rays to be emitted out of the light-emergent face 2. The light rays imported by the first light-incident portion 11 and the light rays imported by the second light-incident portion 12 may be respectively radiated on the whole light-emergent face 2, and may be mutually superposed to form uniformly distributed light rays to be emitted out of the light-emergent face 2. Due to the structure that the light-incident portions 1 are respectively arranged on the left side and the right side of the vehicle light optical element, the number of the light-incident portions 1 arranged on the same side of the vehicle light optical element can be reduced, so that the front-rear size of the vehicle light optical element can be further reduced.

In some embodiments of the vehicle light optical element provided by the present disclosure, as shown in FIG. 12 to FIG. 17, the vehicle light optical element provided by the present disclosure further includes a lens part 4. The lens part 4 is integrally connected to the light-emergent face 2. The light rays imported by the light-incident portion 1 are emitted to the lens part 4 after being reflected by the reflecting face 3, and are projected out under the converging action of the lens part 4 to form a lighting light shape. The lens part 4 and other parts (hereinafter referred to as a concentrator part) of the vehicle light optical element may be integrally poured by using the same transparent material. The lens part 4 is integrally arranged on the vehicle light optical element and can replace the lens in the traditional vehicle light module, so that the structure of the vehicle light module can be simplified, and the stability of the vehicle light module structure can be improved.

In some embodiments of the vehicle light optical element provided by the present disclosure, as shown in FIG. 12 to FIG. 17, the lens part 4 includes a lens light-incident face 41 and a lens light-emergent face 42. The light-emergent face 2 of the concentrator part of the vehicle light optical element is integrally connected to the lens light-incident face 41 of the lens part 4, so that the light-emergent face 2 of the concentrator part only becomes a virtual face. Light rays reflected by the reflecting face 3 can directly enter the lens part 4, and are projected by the lens light-emergent face 42 to form a lighting light shape. In this way, light consumption caused by the fact that light rays in the traditional vehicle light module need to be emitted out of the light-emergent face of the vehicle light optical element and then are emitted through the light-incident face of the lens can be avoided, and the light effect of the vehicle light module can be improved.

As a specific implementation mode of the vehicle light optical element provided by the present disclosure, the lens light-incident face 41 coincides with the light-emergent face 2, so that a smooth transition is formed between the concentrator part and the lens part 4 of the vehicle light optical element. The center of gravity of the vehicle light optical element formed in this way is located at the geometric center of the structure, and the mounting stability is higher.

In some embodiments of the vehicle light optical element provided by the present disclosure, as shown in FIG. 12 to FIG. 17, the lens light-incident face 41 of the lens part 4 of the vehicle light optical element is larger than the light-emergent face 2 of the concentrator part, that is the width and the height of the lens light-incident face 41 are greater than the width and the height of the light-emergent face 2. The light-emergent face 2 is integrally connected to an upper part or a lower part of the lens light-incident face 41, so that the light-emergent face 2 only becomes a virtual face, and part of a solid surface of the lens light-incident face 41 is remained. Light rays can be emitted through the remained solid surface of the lens light-incident face 41, so that the lens part of the vehicle light optical element may be used as an ordinary lens for realizing other lighting functions. In this way, when the vehicle light optical element in this embodiment is used to form the vehicle light module, light rays emitted by a high beam light source may be imported by the light-incident portion 1 and may be projected by the lens part 4 after being reflected by the reflecting face 3 to form a high beam lighting light shape; and light rays emitted by a low beam light source may be converged by a low beam initial optical element and then emitted to the remained solid surface of the lens light-incident face 41, and may be projected by the lens part 4 to form a low beam lighting light shape. In this way, the lens of the high beam and low beam integrated vehicle light module can be omitted, and the structure of the high beam and low beam integrated vehicle light module can be simplified.

Figure 18:
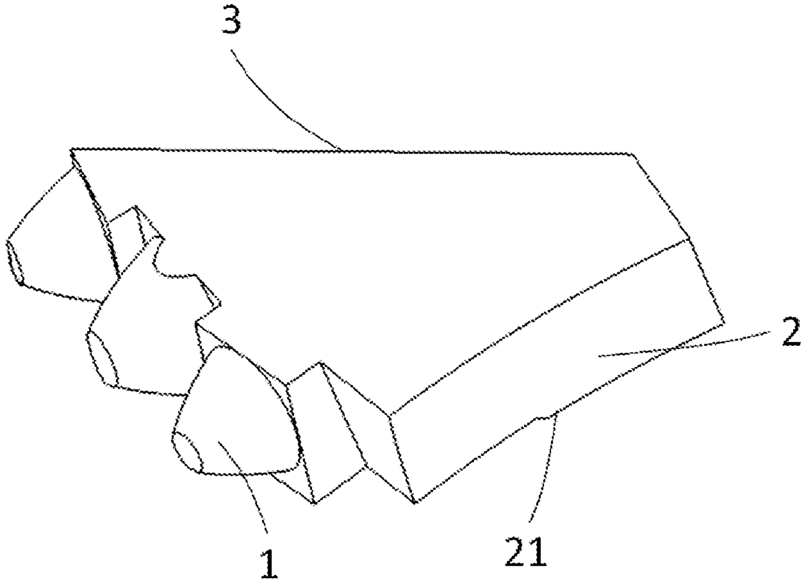
FIG. 18 is a three-dimensional diagram of another embodiment of a vehicle light optical element according to the present disclosure.

As a specific implementation mode of the vehicle light optical element provided by the present disclosure, as shown in FIG. 18, a cut-off line structure 21 is arranged on the light-emergent face 2. The cut-off line structure 21 may be arranged on an upper side edge or a lower side edge of the light-emergent face 2. The cut-off line structure 21 arranged on the light-emergent face 2 may form a bright-dark cut-off line by shielding the light rays emitted out of the light-emergent face 2 so as to form a low beam lighting light shape or a high beam lighting light shape with the bright-dark cut-off line, or may form a bright-dark cut-off line of a low beam lighting shape or a high beam lighting light shape by shielding the light rays emitted by the adjacent low beam light source. In this way, the cut-off line structure of the vehicle light module can be omitted, and the structure of the vehicle light module can be simplified.

The vehicle light optical element according to any embodiment of the present disclosure is used in the vehicle light module provided by the present disclosure.

Figure 19:
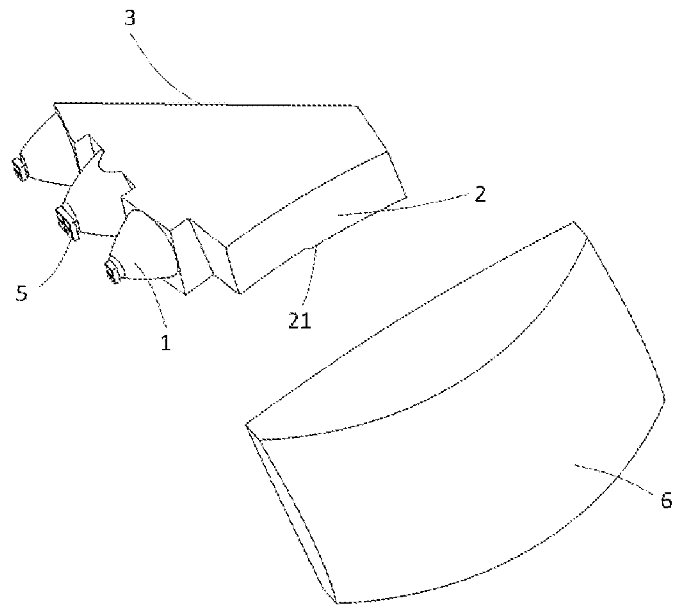
FIG. 19 is a structural schematic diagram of an embodiment of a vehicle light module according to the present disclosure.
Figure 20:
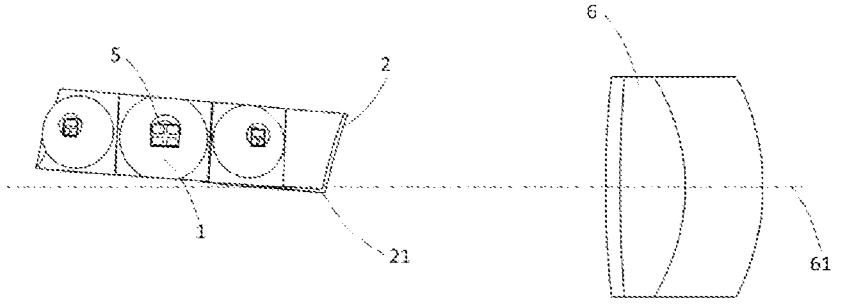
FIG. 20 is a right side view of FIG. 19.

In some embodiments of the vehicle light module provided by the present disclosure, as shown in FIG. 19 and FIG. 20, light sources 5, a vehicle light optical element and a lens 6 are included. The vehicle light optical element includes light-incident portions 1, a reflecting face 3 and a light-emergent face 2, the light-incident portion 1 is a concentrating cup arranged on the right side of the vehicle light optical element; each concentrating cup is provided with one light source 5; light rays emitted by the light source 5 are emitted to the reflecting face 3 after being imported by the concentrating cup, and are emitted to the light-emergent face 2 at the front end of the vehicle light optical element after being reflected by the reflecting face 3. A cut-off line structure 21 is arranged on a lower side edge of the light-emergent face 2; the cut-off line structure 21 is arranged on an optical axis 61 of the lens 6; and light rays emitted to the light-emergent face 2 are emitted to the lens 6 after being shielded by the cut-off line structure 21 and are projected out under the action of the lens 6 to form a low beam lighting light shape with a bright-dark cut-off line.

Figure 21:
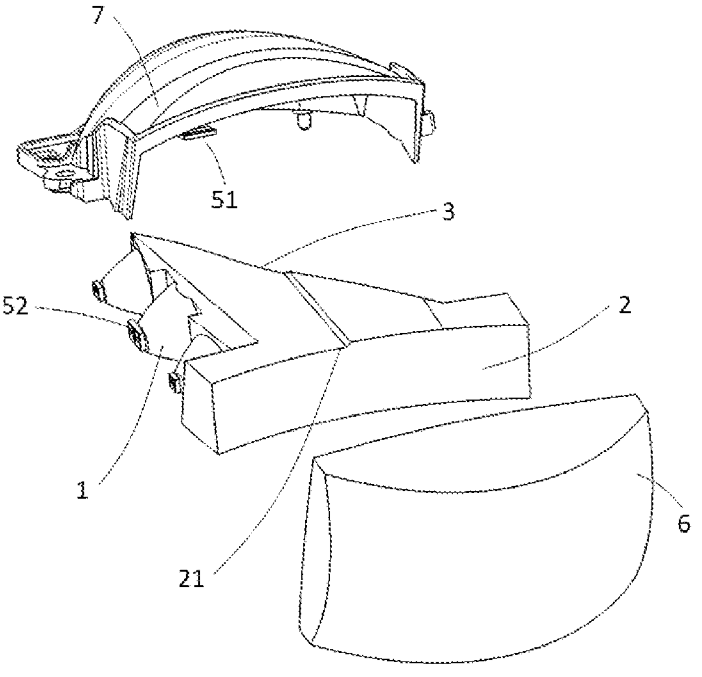
FIG. 21 is a structural schematic diagram of another embodiment of a vehicle light module according to the present disclosure.
Figure 22:
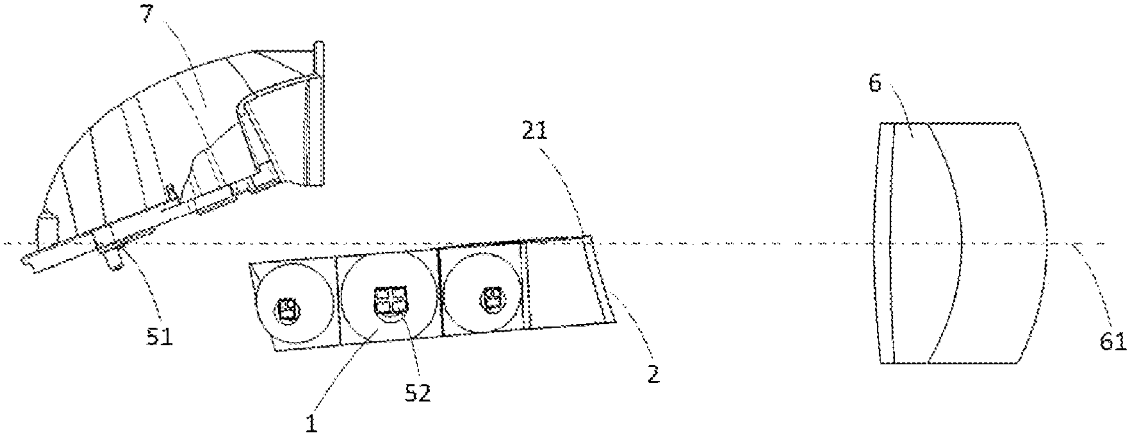
FIG. 22 is a right side view of FIG. 21.
Figure 23:
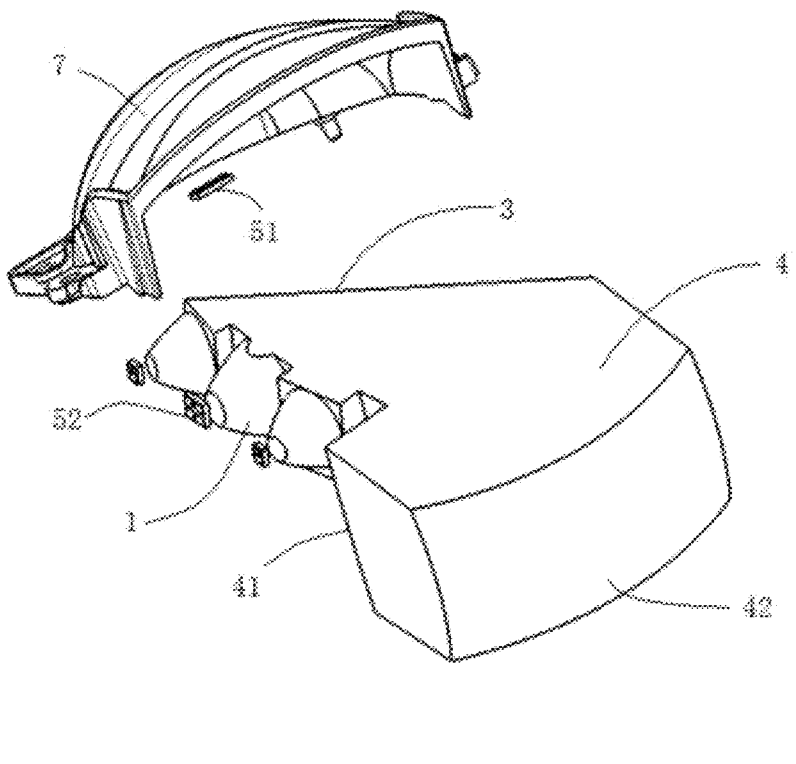
FIG. 23 is a structural schematic diagram of another embodiment of a vehicle light module according to the present disclosure.

In some embodiments of the vehicle light module provided by the present disclosure, as shown in FIG. 21 and FIG. 22, a low beam light source 51, a low beam reflector 7, high beam light sources 52, a vehicle light optical element and a lens 6 are included. The vehicle light optical element includes light-incident portions 1, a light emergent face 2 and a reflecting face 3, the light-incident portions 1 are arranged on the right side of the vehicle light optical element; the light-emergent face 2 is arranged at the front end of the vehicle light optical element; and the reflecting face 3 is obliquely arranged on the left rear side of the vehicle light optical element to reflect the light rays, which are emitted from the light-incident portions 1 to the reflecting face, to the light-emergent face 2. A cut-off line structure 21 is arranged at the upper side edge of the light-emergent face 2, and the cut-off line structure 21 may extend backward from the light-emergent face 21 to the edge of the reflecting face 3. The cut-off line structure 21 at the upper side edge of the light-emergent face 2 is arranged near the optical axis 61 of the lens 6 and located near a focal point of the lens 6. The high beam light source 52 is arranged at the light-incident portion 1. Light rays emitted by the high beam light source 52 are emitted from the light-incident portion 1, are emitted to the lens 6 by the light-emergent face 2 after being reflected by the reflecting face 3, and are projected out under the action of the lens 6 to form a high beam lighting light shape with a bright-dark cut-off line. The low beam light source 51 is arranged at a first focal point of the low beam reflector 7 and located on the optical axis 61 of the lens 6; and a second focal point of the low beam reflector 7 coincides with the focal point of the lens 6. Light rays emitted by the low beam light source 51 are emitted to the lens 6 after being converged by the low beam reflector 7 and shielded by the cut-off line structure 21, and are projected out under the action of the lens 6. Since the irradiation angle of the low beam lighting light shape is larger than the irradiation angle of the high beam lighting light shape, the front end of the vehicle light optical element extends towards the left side and the right side, so that the cut-off line structure 21 extends towards the left side and the right side to form a low beam lighting light shape with a bright-dark cut-off line.

According to the vehicle light optical element provided by the present disclosure, the light-incident portion 1 is arranged on a side of the vehicle light optical element, and the structure behind or below the vehicle light optical element is reduced, so the front-rear size and the up-down size of the vehicle light optical element can be reduced, and the vehicle light optical element has a flat structure with a smaller front-rear size, a smaller up-down size and a larger left-right size. Meanwhile, the light source of the vehicle light and the radiator structure of the light source can make the shape of the vehicle light better adapt to the current flat vehicle light modeling trend by being arranged on the side of the vehicle light optical element along with the light-incident portion 1. In the preferred embodiment of the vehicle light optical element provided by the present disclosure, the structure that the light-incident portions 1 are respectively arranged on the left side and the right side of the vehicle light optical element can further shorten the front-rear size of the vehicle light optical element to adapt to the modeling requirement of the vehicle light. The concentrator part is integrally connected to the lens part 4, so the vehicle light optical element provided by the present disclosure realizes the function of the lens and has higher structural stability. The lens in the traditional vehicle light is omitted, the vehicle light has a simpler structure, and the structural stability becomes higher. Due to the structure that one part of the lens light-incident face 41 of the lens part 4 is integrally connected to the light-emergent face 2, the lens part 4 of the vehicle light optical element further may be used as an ordinary lens and be configured to realize other lighting functions. The cut-off line structure 21 arranged at the edge of the light-emergent face 2 can form a bright-dark cut-off line in a low beam lighting light shape, so that a shield in the traditional vehicle light is omitted and the structure of the vehicle light is simplified. The vehicle light module provided by the present disclosure adopts the vehicle light optical element provided by the present disclosure, which has a smaller front-rear size, a smaller up-down size and a larger left-right size and meets the modeling trend of the current vehicle light. The vehicle light module using the vehicle light optical element in the preferred embodiment provided by the present disclosure also has the advantages of each preferred embodiment.

The vehicle light provided by the present disclosure uses the vehicle light module according to any embodiment of the present disclosure and also has the above advantages.

In the description of the present disclosure, the description referring to the terms "one embodiment", "some embodiments", "a specific implementation mode" and the like means that the specific features, structures, materials or characteristics described in combination with the embodiment or example are included in at least one embodiment or example of the present disclosure. In the present disclosure, the schematic description of the above terms unnecessarily refer to the same embodiment or example. Moreover, the specific features, structures, materials or characteristics described may be combined in any suitable mode in any one or more embodiments or examples.

The above describes the preferred implementation modes with reference to the accompanying drawings, but the present disclosure is not limited thereto. In the scope of the technical concept of the present disclosure, various simple variations may be made to the technical solution of the present disclosure, including the combination of various specific technical features in any proper mode. To avoid unnecessary repetition, various possible combinations will not be described separately in the present disclosure. However, these simple variations and combinations should also be regarded as the contents disclosed by the present disclosure and belong to the protection scope of the present disclosure.

The invention claimed is:

1. A vehicle light optical element comprising:

a light-incident portion, a light-emergent face, a reflecting face, and a lens, wherein the vehicle light optical element is integrally set as a prism shape, the reflecting face, the light-incident portion and the light-emergent face are formed on different sides of the prism shaped vehicle light optical element and the light-incident portion is arranged on a left side and/or a right side of the light-emergent face, and the vehicle light optical element has a flat structure; and the light-incident portion is a concentrating cup structure or other light-incident structures with concave or convex light-incident faces; and the reflecting face reflects light rays, which are emitted from the light-incident portion into the reflecting face, to the light-emergent face, so as to be emitted out of the light-emergent face; the lens is integrally connected to the light-emergent face and capable of projecting light rays emitted out of the light-emergent face to form a lighting light shape, the lens comprises a lens light-incident face and a lens light-emergent face; and the lens light-incident face is integrally connected to the light-emergent face; the lens light-incident face and the light-emergent face are imaginary boundaries between the light-incident portion and lens; the lens light-incident face is larger than the light-emergent face; and the light-emergent face is integrally connected to an upper part or a lower part of the lens light-incident face.

2. The vehicle light optical element according to claim 1, wherein the reflecting face is a flat face which is obliquely arranged relative to the light-incident portion and the light-emergent face.

3. The vehicle light optical element according to claim 1, wherein the light-incident portion comprises a first light-incident portion and a second light-incident portion which are respectively arranged on two sides of the light-emergent face; and the reflecting face comprises a first reflecting face capable of reflecting light rays which are emitted from the first light-incident portion to the first reflecting face, and are reflected to the light-emergent face by the first reflecting face, and a second reflecting face capable of reflecting light rays which are emitted from the second light-incident portion to the second reflecting face, and are reflected to the light-emergent face by the second reflecting face.

4. The vehicle light optical element according to claim 1, wherein the lens light-incident face coincides with the light-emergent face.

5. The vehicle light optical element according to claim 1, wherein a cut-off line structure is arranged on the light-emergent face.

6. A vehicle light module, comprising the vehicle light optical element according to claim 1.

7. A vehicle light, comprising the vehicle light module according to claim 6.

8. A vehicle light according to claim 7, wherein the reflecting face is a flat face which is obliquely arranged relative to the light-incident portion and the light-emergent face.

9. A vehicle light according to claim 7, wherein the light-incident portion comprises a first light-incident portion and a second light-incident portion which are respectively arranged on two sides of the light-emergent face; and the reflecting face comprises a first reflecting face capable of reflecting light rays which are emitted from the first light-incident portion to the first reflecting face, and are reflected to the light-emergent face by the first reflecting face, and a second reflecting face capable of reflecting light rays which are emitted from the second light-incident portion to the second reflecting face, and are reflected to the light-emergent face by the second reflecting face.

10. A vehicle light according to claim 7, wherein a cut-off line structure is arranged on the light-emergent face.

11. A vehicle light module according to claim 6, wherein the reflecting face is a flat face which is obliquely arranged relative to the light-incident portion and the light-emergent face.

12. A vehicle light module according to claim 6, wherein the light-incident portion comprises a first light-incident portion and a second light-incident portion which are respectively arranged on two sides of the light-emergent face; and the reflecting face comprises a first reflecting face capable of reflecting light rays which are emitted from the first light-incident portion to the first reflecting face, and are reflected to the light-emergent face by the first reflecting face, and a second reflecting face capable of reflecting light rays which are emitted from the second light-incident portion to the second reflecting face, and are reflected to the light-emergent face by the second reflecting face.

13. A vehicle light module according to claim 6, wherein a cut-off line structure is arranged on the light-emergent face.

* * * * *